United States Patent [19]
Loby

[11] 3,908,613
[45] Sept. 30, 1975

[54] METHOD OF FEEDING AN INTERNAL COMBUSTION ENGINE AND IMPROVED APPARATUS FOR PERFORMING THE SAME

[76] Inventor: Gilbert Maurice Loby, 2, rue de la Touche, Renaze, France

[22] Filed: May 26, 1971

[21] Appl. No.: 146,991

[30] Foreign Application Priority Data
June 25, 1970 France .............................. 70.23525

[52] U.S. Cl. ...... 123/25 C; 123/25 F; 123/139 AW; 123/1 A; 123/140 MP
[51] Int. Cl. ... F02d 19/00; F02d 47/00; F02d 25/02
[58] Field of Search ............ 123/325, 25.3, 140 MP, 123/25.2, 119 E, 1 A

[56] References Cited
UNITED STATES PATENTS

| | | | |
|---|---|---|---|
| 898,512 | 9/1908 | Schreber ........................... | 123/25.3 |
| 1,491,376 | 4/1924 | Bochet ............................... | 123/25.3 |
| 1,722,707 | 7/1929 | Ritter ................................. | 123/325 |
| 1,806,319 | 5/1931 | Trechsel ............................ | 123/325 |
| 2,067,461 | 1/1937 | Ramsey ............................. | 123/325 |
| 2,319,858 | 5/1943 | Grow ................................. | 123/25.3 |
| 2,633,115 | 3/1953 | Waring .............................. | 123/140 MP |

FOREIGN PATENTS OR APPLICATIONS

| | | | |
|---|---|---|---|
| 1,260,732 | 3/1960 | France .............................. | 123/25.3 |

*Primary Examiner*—Laurence M. Goodridge
*Assistant Examiner*—Ronald B. Cox
*Attorney, Agent, or Firm*—Irving M. Weiner

[57] ABSTRACT

A method and means for injecting an atomized fuel into each cylinder of an internal and combustion engine parallel with an atomized detonation inhibitor.

9 Claims, 6 Drawing Figures

U.S. Patent   Sept. 30,1975   Sheet 1 of 2   3,908,613

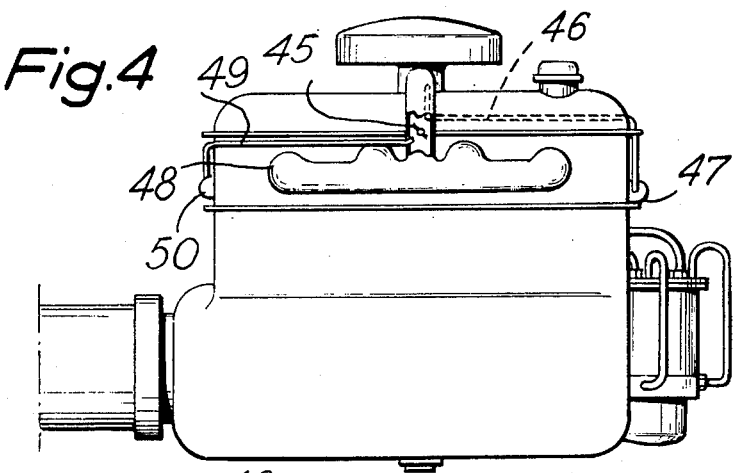
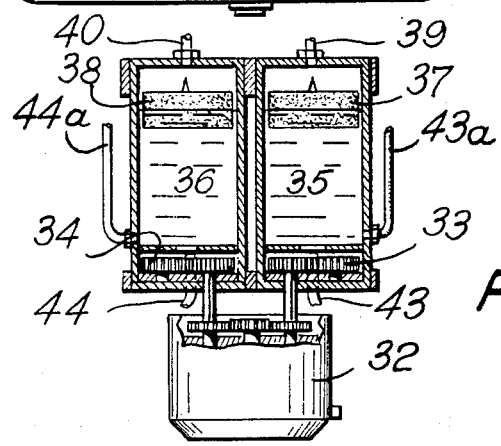
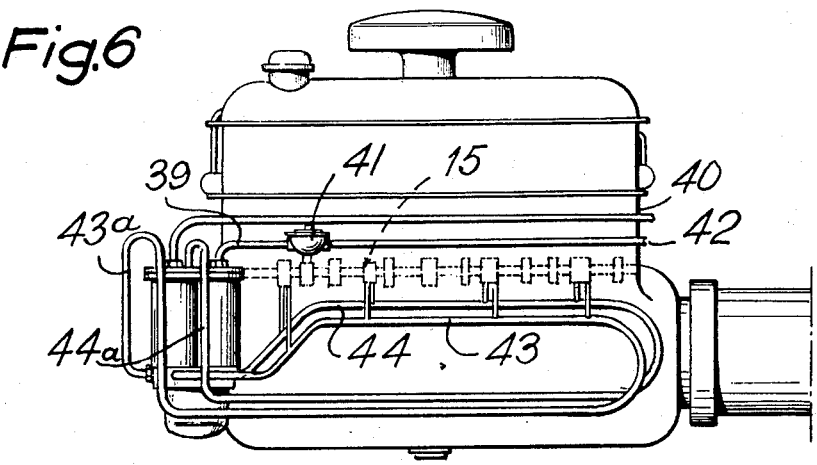

METHOD OF FEEDING AN INTERNAL COMBUSTION ENGINE AND IMPROVED APPARATUS FOR PERFORMING THE SAME

The technical province of this invention is that of injection systems for internal combustion engines.

French Pat. No. 1,260,732 described a method of feeding an internal combustion engine having a controlled ignition wherein for each cycle a proportioned quantity of fuel is injected into a cylinder substantially at the instant when the volume of the cylinder is close to maximum in a direction approximately opposite to that followed by the flow of a cylinder filling oxidizer to provide in the cylinder an individual internal carburation with a counterstream effect.

Likewise provided was a way of carrying this method into practice in accordance with which a detonation inhibitor, such as atomized water, was introduced into the cylinder.

Means for performing the method were furthermore described in the above-mentioned patent and included a closed-type metering injector for each cylinder, the injector being arranged to face the incoming stream of oxidizer and being associated to an adjustable-opening mechanism activated substantially when the piston of the cylinder completed its oxidizer induction stroke.

A water atomizer was provided in the engine as a means for injecting a detonation inhibitor, and this atomizer was mounted upstream of the oxidizer induction regulating mechanism on the oxidizer inlet tract.

The method and mechanisms of the kind hereinbefore described are susceptible of improvements, especially in respect to the injection of the detonation inhibitor.

The present invention relates to such an improvement and accordingly provides a method of the above-mentioned kind wherein the detonation inhibitor is injected by mechanical means into the combustion chamber itself parallel with the fuel injected thereinto.

There is thereby achieved an intimate mixture of preferably equistreaming oxidizer, detonation inhibitor and fuel, i.e., injecting oxidizer, detonation inhibitor, and fuel in unison, or simultaneously.

The invention further includes a mechanism for performing the above method, which mechanism notably includes a dual injector with a single needle which uncovers, nearly simultaneously, first the fuel inlet opening and then the detonation inhibitor opening to achieve a homogeneous atomization and an intimate mixture of the fuel and detonation inhibitor.

In one specific embodiment the injector comprises a lubricated needle.

The invention also includes mechanisms for feeding the fuel and detonation inhibitor and means for distributing and adjusting the quantities thereof admitted.

In addition to the swirl resulting from counterstreamed injection the above means make it possible to produce a fine and homogeneous suspension of fuel and detonation inhibitor, thus considerably increasing the permissible compression ratio of an engine fed in this way. By taking advantage of the very nature of water, not only are the detonation phenomena deferred to a marked extent but also the gases expanding during the power stroke are greatly accelerated and electrical ignition is improved.

Further, any fuel may be used in an engine equipped in this way. Another advantage is the lower engine running temperature, notably at the cylinder heads. This makes it possible to use leaner fuel mixtures in constrast to the customary practice of artificially enriching the mixture to prevent undesirable temperature rises in the cylinder heads.

The description which follows with reference to the accompanying non-limitative exemplary drawings will give a clear understanding of how the invention can be carried into practice.

FIG. 4 schematically depicts a power unit and the location of the connections permitting regulation of the intake of detonation inhibitor and fuel;

FIG. 5 is a sectional view of a single-motor dual fuel and water pump; and

FIG. 6 is complementary to FIG. 4 and shows the other side of the power unit.

Figure 1:
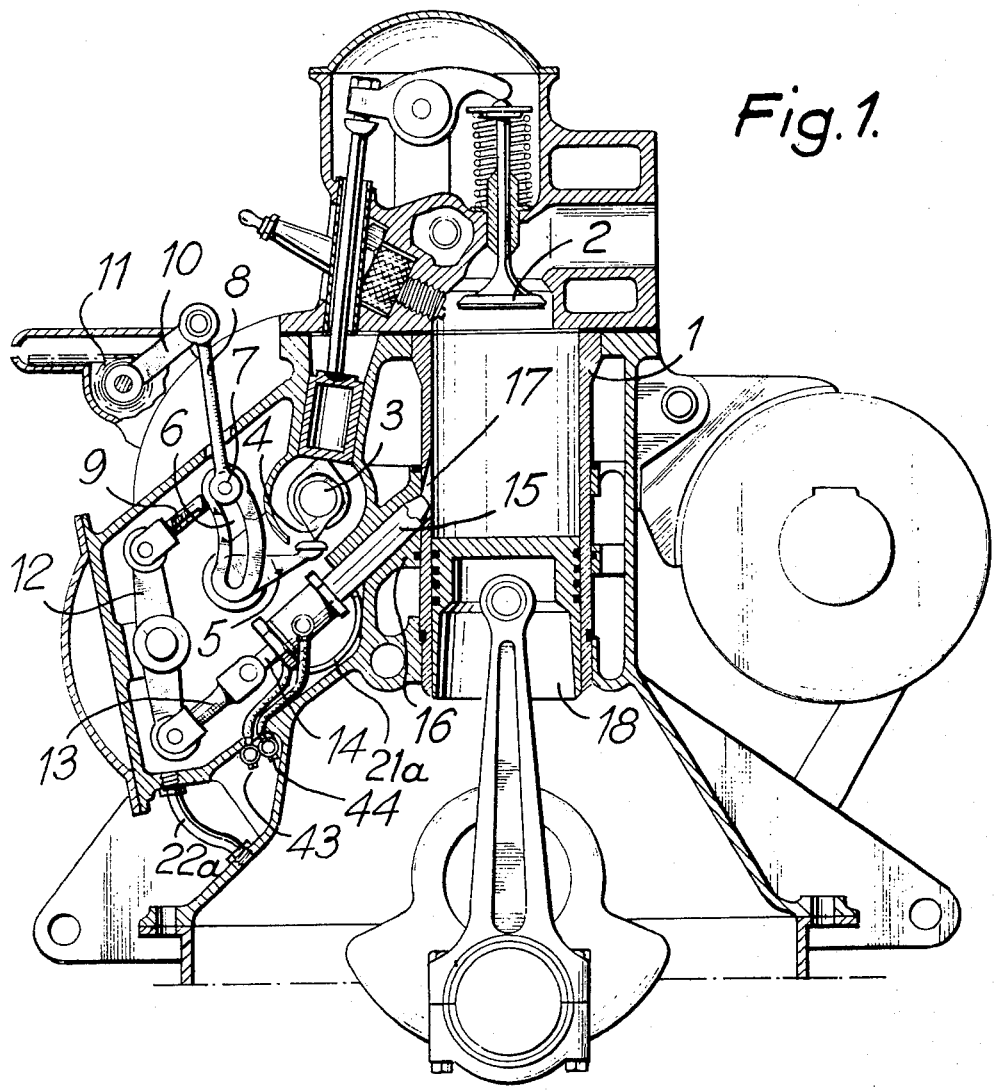
FIG. 1 shows in schematic section the upper part of an engine equipped according to this invention.
Figure 2:
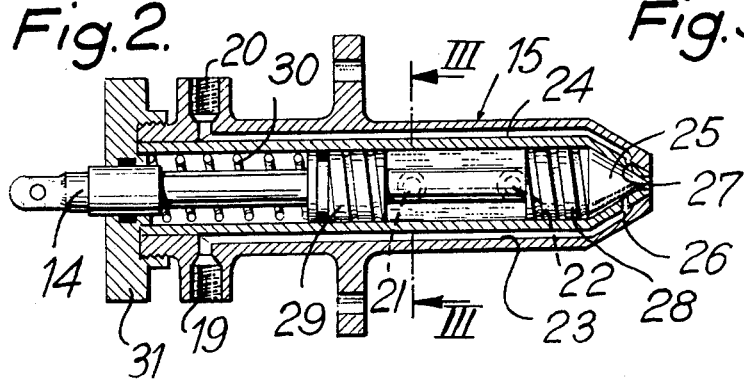
FIG. 2 is a sectional showing of a dual injector with a single needle.
Figure 3:
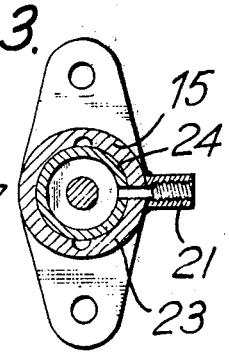
FIG. 3 is a section through the line III—III of FIG. 2, as viewed along the arrows.

The arrangement shown in FIG. 1 includes a power unit, such as an internal combustion engine, with overhead valves 2, and a camshaft 3. Independently of the cam lobes operating the valves 2, camshaft 3 comprises, for each cylinder, a cam lobe 4 which actuates a rocker arm 5, the cam-remote arm of which is formed with an arcuate slot 6 therein. Capable of sliding along slot 6 is a pin 7 to which are pivotally connected a driving link 8 and a driven link 9. Link 8 is positioned by means of a crank 10 which is actuated by a rack and a pinion device 11 responsively to an adjustment action to be described hereinafter.

The link 9 is pivotally connected to a beam-lever 12 hingedly connected through a link 13 to the stem of an injection needle 14 projecting from a dual injector 15. Ejection from the injector 15, which is restrained in the cylinder block by a flange 16 for retaining the liner of the cylinder 1, in conjunction with gaskets for preventing cooling water from entering the injector, is effected upwardly and at an angle to the cylinder axis through a port 17 in the cylinder liner, the latter being provided with suitable locating means to that end and the above-described mechanism being so devised as to cause injection to take place in the configuration shown in the drawings when piston 18 is close to its bottom position at the end of the air induction stroke, just before it begins to move upwards once more for the compression stroke.

The means used for controlling the injection needle 14 are similar to those described in the aforesaid French patent.

On the other hand, the dual injector 15 comprises a fuel inlet 19 and a separate detonation inhibitor inlet 20, which denotation inhibitor is water in the exemplary embodiment described herein. The dual injector further includes a lubricating oil inlet 21 to provide lubrication to the injection needle as it moves in the body of the dual injector and an oil discharge orifice 22. The dual injector is connected to an oil delivery conduit 21a which is in turn connected to a pressurized oil distributing network, and the case enclosing the injector tappets communicates with the crankcase through an oil return pipe 22a.

Formed in the body of the dual injector is a fuel passage 23 and a water passage 24, these passages debouch at slightly different levels from the conical seat which receives the head 25 of injection needle through calibrated orifices 26 and 27. These orifices are so calibrated as to enable the amount of fuel to be metered and the amount of water to be proportioned thereto, the two liquids being admitted at inlets 19 and 20 at constant pressures irrespective of engine RPM, other than for power unit starting when the pressure must be increased somewhat over what it is when the power unit is operating The injection needle includes a bearing surface 28 formed with a helical groove disposed behind or aft of the head 25 and, remote therefrom, a second similar bearing surface 29, the space between these two surfaces being that from which the oil inlet 21 debouches when the injector is closed.

Beneath bearing surface 29 is a return spring 30 which thrusts against a guide plug 31 which seals the base of the injector base. With the injector is closed, the oil outlet 22 remains uncovered by the bearing surface 28 to permit oil circulation.

With this arrangement, when conical head 25 withdraws the two liquids conveyed through inlets 19 and 20 to the fuel passage 23 and water passage 24, respectively, are injected into the cylinder 1 and atomized in the cylinder 1 which produces a very intimate mixture or mixed suspension of, for example, gasoline and water.

The needle is lubricated, since during reciprocating movements thereof the surfaces 28 and 29 spread oil over the surfaces upon which they bear, but this lubrication does not extend to the portion formed by the head 25.

It is preferable to ensure abrupt movement of the injection needle 14 by imparting a pointed contour to cam lobe 4, whereby to cause rapid opening and closing of the injector, such rapid closure makes for an increased atomization swirl and prevents a dripping of the fuel and water.

By virtue of the constant-pressure fuel and water feed system, the quantities injected depend solely on the extent of withdrawal of the head 25. The metering of fuel and water in fixed proportions is obtained simply and accurately at all engine speeds through displacement of the pin 7 in the arcuate slot 6 responsive to movement of the rack and pinion mechanism 11. The position shown in FIG. 1 corresponds to a maximum amount of fuel and water induction into the cylinder 1. If the pin 7 is moved along slot 6 into coincidence with the fulcrum point of rocker 8, the dual injection needle 14 will not be moved thus making it possible to sweep through the entire range of possible induction levels with ease, regularity and accuracy.

The means for feeding the injector hereinbefore described with fuel and water at constant pressure are a dual pump with a single electric motor 32 which drives two parallel fuel and water gear-pumps 33 and 34, respectively, these pumps being located at the bases of chambers 35 and 36, respectively. These chambers 35 and 36 include floats 37, 38 which have needle-valves disposed thereon. Supply pipes 39, 40, which may be closed by the needle-valves, are connected to the chambers at the tops thereof. The fuel supply pipe 39 includes a conventional pump 41 which draws fuel through a pipe 42 which interconnects the pump 41 to a fuel tank.

The water supply pipe 40 is supplied with water flowing under the influence of gravity from a water header tank. Delivery outlets 43 and 44 of the pumps communicate with associated rails from which flexible tubes lead up to the fuel and water inlets 19 and 20 of injectors 15. Obviously, the delivery outlets 43 and 44 are provided with return conduit means 43a and 44a to the chambers 35 and 36.

The constant speed of the electric motor 32 ensures constant-pressure inflow to the rails and hence to the injectors. For engine starting, means (not shown) are provided for momentarily increasing the rotation speed of the electric motor 32, which means may be formed for instance by a lever-controlled rheostat having a resistive element which is short-circuited for engine starting, but part of which is series-connected to the pump energizing circuit once the engine is running. These simple means require no illustration and no further description.

Insofar as adjustment of the position of rack and pinion 11 for each injector is concerned, this is determined according to the degree of induction required.

Instead of direct actuation by the driver of a vehicle equipped with an engine having this injector system, recourse may be had to an arrangement which takes into account the position of the carburetor air inlet butterfly-valve 45 (FIG. 4), motion of which is controlled by the accelerator pedal. Adjacent and above the butterfly-valve is an air intake 46 for controlling a first diaphragm-box 47, the diaphragm of which is acted upon by a return spring and is connected through convenient linkage to the rack of the rack and pinion 11, the associated pinion of which is made angularly fast with the crank 10 through a common shaft.

Accordingly, the position carburetor inlet butterfly-valve 45 retroacts indirectly, as a function of the depression at the inlet of engine induction manifold 48, on the position of pin 7 in arcuate slot 6 and hence on the stroke imparted to injection needle 14 in each injector.

Further, for cases when butterfly-valve 45 is closed and the engine is on the overrun and acting as a brake, a second depression take-off 49 is provided beneath valve 45 to control a second diapragm-box 50 the function of which is to operate an electric contact switch which closes the circuit of an electromagnet for overridingly returning the rack 11 into the position in which pins 7 coincide with the fulcrums of rockers 8, which position corresponds to constant and overriding shutoff of the injectors, thereby causing zero intake of fuel and detonation inhibitor during engine overruns, such as when an automobile is descending a hill. This arrangement increases the engine braking effect and reduces fuel consumption to zero during these operating phases.

On the other hand as soon as the accelerator pedal is depressed and butterfly-valve 45 begins to open, the depression in the induction manifold suddenly decreases, which, via diaphragm-box 50, breaks the rack return-motion electromagnet circuit, causing the rack to revert to its normal position and instantly restores fuel injection.

The principle operation of the above-described system is as follows.

Proportionately to the magnitude of each retraction of the injector conical heads 25, proportioned quantities of fuel and water in the liquid state are injected into each cylinder 1 in the form of two parallel strams of droplets in suspension.

The presence of the water in the mixture under compression, in which the temperature increases, makes it possible to limit the temperature by reason of the heat consumed for vaporization of the droplets, the water vaporization heat being maximal.

The production of water vapor improves the conditions of propagation of electrical ignition and even of generation of the igniting spark, yet prevents the onset of the detonation phenomenon.

With this arrangement, not only is it possible to improve ignition and combustion itself, but also to considerably increase the engine compression ratio, the detonation phenomenon being set back or decreased to an extreme degree.

The efficiency of such an engine is thus unusually high, and even the more so since lean mixtures can be used.

Further, the improved sparking and ignition conditions make it possible not only to use very-low-octane-value fuel, hence very cheap light fuels, but even to the use of heavy fuels that have theretofore been considered impossible to ignite electrically, such heavy fuels being customarily used only in compression-ignition engines, in which "laminar" atomization must be effected by injection at very high pressure.

In the arrangement hereinbefore described, on the contrary, the complex injection takes place at low pressure, being effected substantially into a cylinder in which atmospheric pressure reigns. Accordingly, the above-described injection system is much simpler, involves fewer leaktightness and lubrication constraints and is above all not subject to erosion, notably of the orifices, as is the case with injectors operating at very high pressures.

Concerning the matter of the internal design of the injectors proper, there are several possible modes of fabrication. For instance, tubes matching the passages 23 and 24 may be buried in a metal cast at relatively low temperature; alternatively, passages may be obtained by machining or casting, as is the case for the dual-body injector shown in the drawings, the passages being then reduced to mere grooves. Manifestly, other manufacturing methods would also be possible.

With regard to the method of actuating the needles 14, the apparatus described in the above example utilizes an arcuate slotted slideway or arcuate slot 6 in line with rocker 8, but it goes without saying that such a slideway could be provided in a different location, notably at one of the ends of beam-lever 12 and more particularly at that end which receives the pivotal connection for the link 13 controlling injection needle 14.

It is clear furthermore that other changes could be made in the embodiments hereinbefore described without departing from the scope of the invention. For instance, the dual injectors could be replaced by injector pairs comprising a fuel injector separate from a water injector. Similarly, the locations of the injectors could be other than at the lower ends of the cylinders, and more specifically in the cylinder head, at least in respect of one of the two injectors.

In order to further improve ignition and reduce the dangers of pollution, it would be possible to associate an extremely active oxidizer to the detonation inhibitor, a preferred example being oxygen which could conveniently be injected with the detonation inhibitor (water) in the form of hydrogen peroxide. The latter could be prepared by adjusting the outflow from a pressure-reducing valve associated with a high-pressure oxygen storage bottle, the valve regulating the flow of oxygen as a function of engine RPM, for example, and the oxygen could be directed into the above-described chamber 36 so that it may dissolve in the water.

The pressure-reducing valve may, for example, be regulated by linkage means associated with the crank 10.

What I claim is:

1. A dual injector mechanism for feeding a cylinder of an internal combustion engine comprising:
    a dual injector body having a conical seat;
    a fuel inlet;
    a fuel passage formed in the body;
    a detonation inhibitor inlet;
    a detonation inhibitor passage formed in the body and parallel to the fuel passage;
    a single needle mounted in the body and having a head received in the seat;
    means for moving the needle;
    a lubricating oil inlet formed in the body;
    a lubricating oil discharge orifice formed in the body;

a first bearing surface formed on the needle;
    a second bearing surface formed on the needle and spaced apart from the first bearing surface; and
    wherein each of the passages has a calibrated orifice formed behind the head and at different levels from the seat, the single needle near-simultaneously uncovering both orifices to deliver a homogeneous atomized mixture of fuel and inhibitor to the cylinder when at the bottom of its stroke, and the two bearing surfaces define an oil inlet space, one of the bearing surfaces being disposed behind the head portion of the injector needle which uncovers the oil discharge orifice when the injector is in its shut-off position.

2. A mechanism as claimed in claim 1 wherein the injector is lubricated by oil circulation and which includes means for injecting fuel and detonation inhibitor at a constant pressure independent of the rotational speed of the engine.

3. A mechanism for feeding an internal combustion engine comprising a dual injector having a single injector needle which near-simultaneously uncovers a calibrated fuel inlet orifice and a calibrated detonation inhibitor inlet orifice, the injector needle being lubricated by oil circulation, and wherein the injector needle includes two spaced apart grooved bearing surfaces which define an oil inlet space, one of said surfaces being disposed behind a head portion of the injector needle which uncovers an oil discharge orifice when the injector is in its shut-off position.

4. A mechanism as claimed in claim 1, including a dual-body pump driven by a single independent motor which delivers the fuel and the detonation inhibitor to the injectors at constant pressures.

5. A mechanism as claimed in claim 4, wherein the injectors are actualated by individual mechanisms comprising means defining slotted slideways for determining the degree of needle travel, said means defining the slotted slideways move responsively to the joint actions of associated cam lobes on a camshaft of the internal combustion engine and means for adjusting the position of slides movable within said slotted slideways.

6. A mechanism as claimed in claim 5, wherein includes the slide adjusting means include actuating means dependent upon an degree of aperture of the oxidizer inlet butterfly-valve.

7. A mechanism as claimed in claim 6, wherein said slide adjusting means includes a first diaphragm-box communicating with depression sensing means having a port inside a manifold upstream of the oxidizer inlet butterfly-valve and controlling means for instantly returning said slides to a position in which the injection needles cannot be actuated when, upon closure of said butterfly-valve, the depression sensed by said second diaphragm-box exceeds a predetermined value.

8. A mechanism as defined in claim 2 wherein the bearing surfaces are grooved bearing surfaces.

9. A method of feeding the cylinders of an internal combustion engine, which comprises:
    injecting a fuel in a predetermined direction into the cylinder of the internal combustion engine at a point in time when a piston operatively associated in the cylinder is at the bottom of its stroke;
    at the same time and together with the injecting of the fuel injecting a detonation inhibitor in admixture with an oxidizer into the cylinder of the internal combustion engine in the same predetermined direction in which the fuel is injected; and wherein injection of the fuel and detonation inhibitor and oxidizer admixture is carried out at a constant pressure independent of the rotational speed of the engine.

\* \* \* \* \*